(12) United States Patent
Inoue et al.

(10) Patent No.: US 8,229,271 B2
(45) Date of Patent: Jul. 24, 2012

(54) MICROCOMPUTER, SYSTEM INCLUDING THE SAME, AND DATA TRANSFER DEVICE

(75) Inventors: Hideo Inoue, Tokyo (JP); Yuji Shimoyama, Tokyo (JP)

(73) Assignee: Renesas Electronics Corporation, Kanagawa (JP)

(*) Notice: Subject to any disclaimer, the term of this patent is extended or adjusted under 35 U.S.C. 154(b) by 391 days.

(21) Appl. No.: 12/552,704

(22) Filed: Sep. 2, 2009

(65) Prior Publication Data

US 2010/0080538 A1    Apr. 1, 2010

(30) Foreign Application Priority Data

Oct. 1, 2008  (JP) .................................. 2008-256475

(51) Int. Cl.
*H04N 5/935* (2006.01)

(52) U.S. Cl. ...................................................... 386/210

(58) Field of Classification Search .................. 386/210; 348/231.99, 222.1, 317, 564
See application file for complete search history.

(56) References Cited

U.S. PATENT DOCUMENTS

| 7,177,955 B2 | 2/2007 | Fukumitsu et al. |
| 2007/0285698 A1* | 12/2007 | Wang et al. ................... 358/1.13 |

FOREIGN PATENT DOCUMENTS

| JP | 5-127788 | 5/1993 |
| JP | 2002-091904 | 3/2002 |
| JP | 2002-297080 | 10/2002 |
| JP | 2005-028875 | 2/2005 |

* cited by examiner

*Primary Examiner* — Thai Tran
*Assistant Examiner* — William Tran
(74) *Attorney, Agent, or Firm* — McDermott Will & Emery LLP

(57) ABSTRACT

A microcomputer is provided, which can load data of different areas in parallel and transfer the loaded data to a storage circuit. The microcomputer includes a CPU to control a DRIs each of which loads image data of a prescribed area out of image data inputted from a camera and transfers the image data to a memory blocks, and the DRIs each of which transfers image data of respectively different area out of the image data inputted from the camera to the memory blocks. Therefore, it becomes possible to load image data of different areas in parallel and to transfer the loaded image data to the memory blocks.

3 Claims, 18 Drawing Sheets

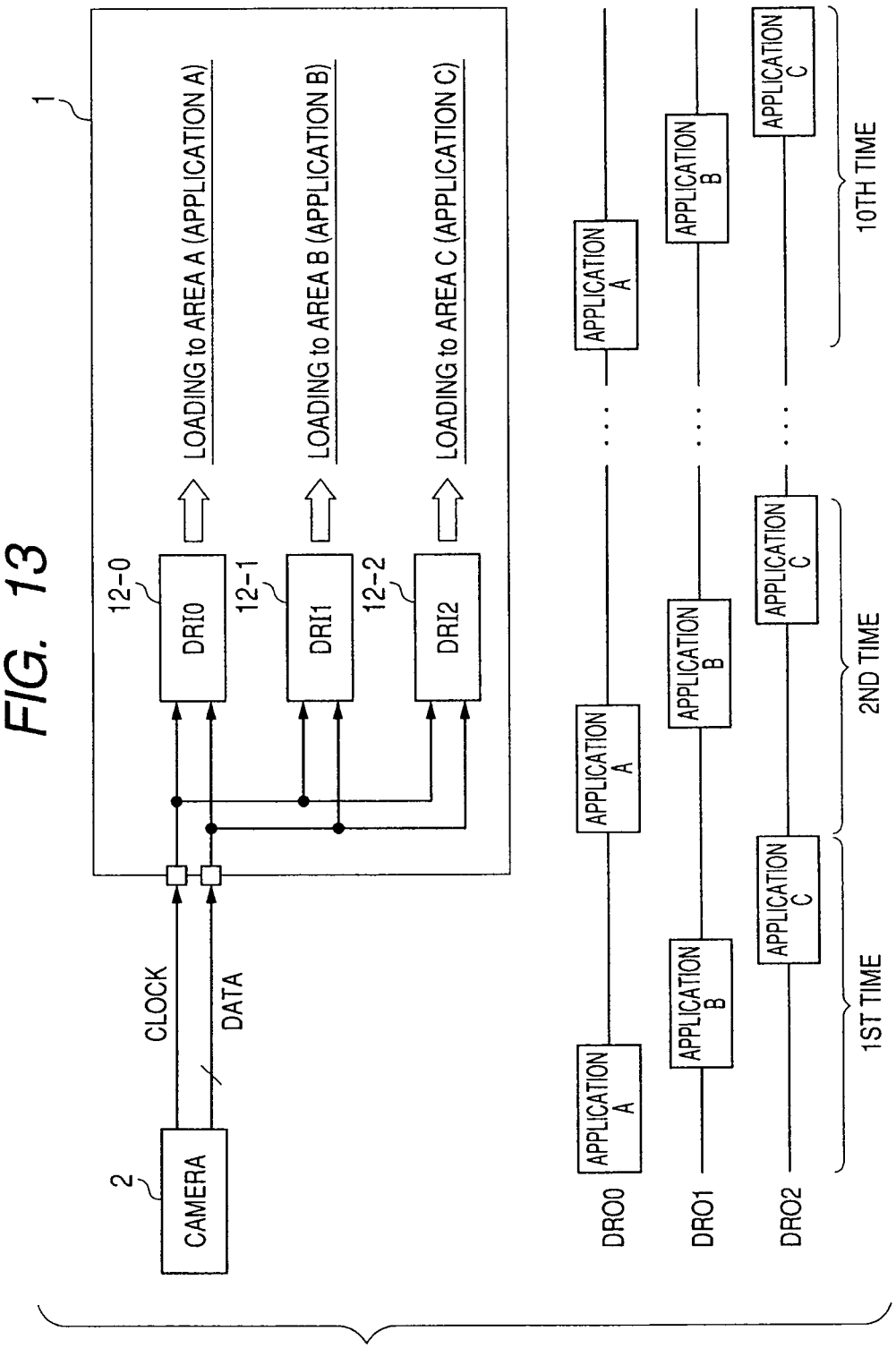

10 PIXELS

3 PIXELS

FIG. 16(a)

10 PIXELS

10 PIXELS

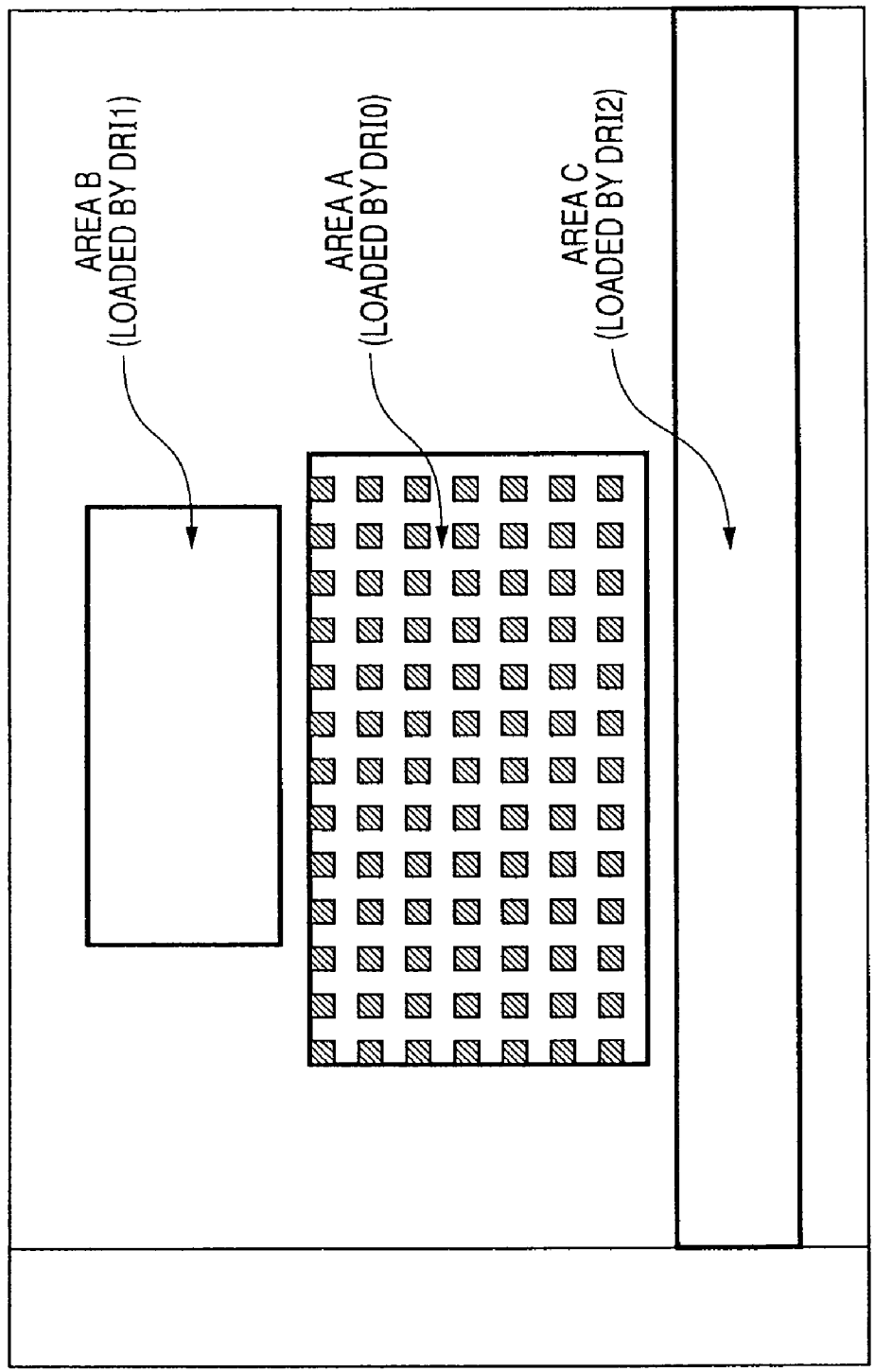

MICROCOMPUTER, SYSTEM INCLUDING THE SAME, AND DATA TRANSFER DEVICE

CROSS-REFERENCE TO RELATED APPLICATIONS

The disclosure of Japanese Patent Application No. 2008-256475 filed on Oct. 1, 2008 including the specification, drawings and abstract is incorporated herein by reference in its entirety.

BACKGROUND OF THE INVENTION

The present invention relates to technique of performing high speed processing of a large quantity of data, such as image processing of a camera and high-speed data transmission, and especially relates to a microcomputer, a system including the microcomputer, and a data transfer device, in which plural pieces of prescribed data are extracted from data of a processing object, and are transferred to respectively different areas in a memory.

In recent years, demands of high speed processing of a large quantity of data are growing in a technical field of image processing, etc. For example, in performing arithmetic processing to an image captured by a camera and displaying the image after the arithmetic processing, it is desirable to process a large quantity of data at high speed, when real time nature is required. Inventions disclosed by following Patent Literatures 1-4 describe technique relevant to the matter.

An invention disclosed by Patent Literature 1 relates to a display driving circuit aiming at writing plural pieces of data, even when an external selection signal does not change. Display data from the exterior is loaded into a shift register via a CCB interface. According to a display data transfer counted by a serial data counter, the display data is sequentially written in a DCRAM or an ADRAM.

An invention disclosed by Patent Literature 2 aims at realization of high-speed decompressing of compressed data and high-speed data transfer to a fluid injection head, and also aims at striking acceleration of an execution speed of fluid injection of a fluid injector as compared with the past. Record control data received by an interface unit is transferred to a switching control block, and to a header analysis block to conduct analysis of a header. When data succeeding the header is a command, the command is stored in a command storing register, and when the data is compressed record data, the data is transferred to a data transfer control block. An MPU accesses the command storing register and conducts a command analysis. Compressed record data is stored in a FIFO memory via a first dedicated bus from the data transfer control block, and is transferred to a DECU via a second dedicated bus.

An invention disclosed by Patent Literature 3 aims at dealing with different kinds of serial data by one serial interface circuit. A selector circuit is arranged on one side or both sides of plural transmitting/receiving FIFOs, and the number of allocation and coupling method of the FIFOs to a serial input/output circuit are changed by switching of the selector circuit.

An invention disclosed by Patent Literature 4 relates to a multiinput circuit of a switch signal, aiming at reduction of the number of in-use terminal of a parallel interface, and allowing a data input of many switches. The multiinput circuit is comprised of a parallel interface, a CPU, and plural hexadecimal switches. A common data bus and a data output enabling signal line of the switches couple the interface and the switches. A data output switch is selected by a data output enabling signal, and data is inputted using the common data bus. Accordingly, the number of in-use terminal of the parallel interface is reduced.

Patent Literature 1: Japanese Unexamined Patent Publication No. 2002-297080
Patent Literature 2: Japanese Unexamined Patent Publication No. 2005-28875
Patent Literature 3: Japanese Unexamined Patent Publication No. 2002-91904
Patent Literature 4: Japanese Unexamined Patent Publication No. Hei 5(1993)-127788

SUMMARY OF THE INVENTION

However, it is difficult to apply the inventions disclosed by the above-mentioned Patent Literatures 1-4 to technique for extracting plural pieces of prescribed data out of data of a processing object and transferring each of the data to a different area in a memory.

The present invention has been made to solve the above problem and provides a microcomputer, a system including the microcomputer, and a data transfer device, which allow to load data of different areas in parallel, and to transfer the loaded data to a storage circuit.

According to one embodiment of the present invention, a microcomputer which transfers image data inputted from a camera to a memory block is provided. The microcomputer includes: plural Direct RAM Interfaces (DRIs) which load image data of a prescribed area out of the image data inputted from the camera and transfer the loaded image data to a memory block; and a CPU which controls the plural DRIs so as to transfer image data of respectively different areas out of the image data inputted from the camera to the memory block.

Since the CPU controls the plural DRIs so as to transfer image data of respectively different areas out of the image data inputted from the camera to the memory block, it becomes possible to load image data of different areas in parallel and to transfer the loaded image data to the memory block.

BRIEF DESCRIPTION OF THE DRAWINGS

FIG. 13 is a drawing illustrating an example of a loading timing of image data by the microcomputer 1 according to the first embodiment of the present invention;

FIG. 15 is a drawing for explaining loading of image data employed by Application B;

FIG. 16 is a drawing for explaining loading of image data employed by Application C;

FIG. 17 is a drawing illustrating an example of a screen display of image data stored in a memory block 0 (3-0) through a memory block N (3-N)

DETAILED DESCRIPTION OF THE PREFERRED EMBODIMENTS (First Embodiment)

Figure 1:
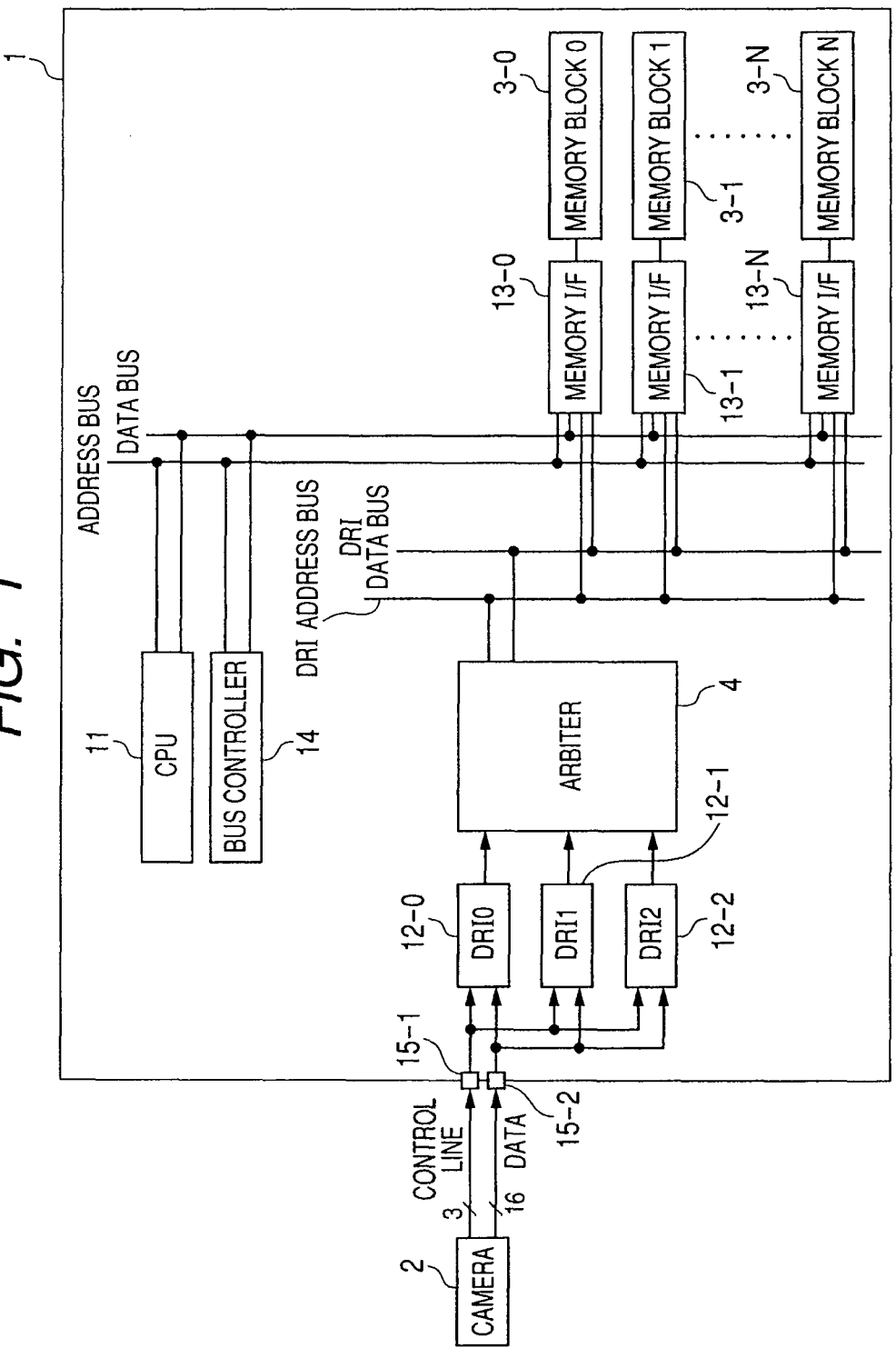
FIG. 1 is a block diagram illustrating an example of configuration of a system including a microcomputer according to a first embodiment of the present invention.

FIG. 1 is a block diagram illustrating an example of configuration of a system including a microcomputer according to a first embodiment of the present invention. The present system includes a microcomputer 1, a sensor 2 such as a camera, and a memory block 0 (3-0) through a memory block N (3-N). In the present embodiment, a case where a camera is used as an example of the sensor 2 is explained. However, the sensor 2 is not restricted to the case, and other devices which output data at high speed may be equally used.

Although the capacity of each memory block and the number of the memory block are not restricted in particular, 32 pieces of 16-kByte memory blocks are employed, for example. These memory blocks are mapped in continuous address and coupled to a bus so that simultaneous access to different memory blocks becomes possible.

Although the memory block is comprised of a storage circuit, such as an SRAM (Static Random Access Memory), the memory block is not restricted to the case. Any device which can just store data can be employed as the memory block.

To the microcomputer 1, a control signal outputted from the camera 2 is inputted via a terminal 15-1, and image data outputted from the camera 2 is inputted via a terminal 15-2. The microcomputer 1 extracts image data of plural prescribed area out of the image data outputted from the camera 2, and transfers the image data for every prescribed area to the memory block 0 (3-0) through memory block N (3-N).

The microcomputer 1 includes an arbiter 4, a CPU 11, a direct RAM interface 0 (hereafter referred to as DRI0) (12-0) through a direct RAM interface 2 (also referred to as DRI2) (12-2), a memory I/F 13-0 through a memory I/F 13-N, and a bus controller 14. In particular the DRI0 (12-0) through DRI2 (12-2) will be called a data transfer device.

The CPU 11 performs entire control of the microcomputer 1, and makes the DRI0 (12-0) through DRI2 (12-2) operate, by setting values to registers in the DRI0 (12-0) through DRI2 (12-2) as described later. The DRI0 (12-0) through DRI2 (12-2) have the same configuration, the details of which will be described later.

The CPU 11, the bus controller 14 and the memory I/F 13-0 through memory I/F 13-N are coupled via buses (an address bus, a data bus). The arbiter 4 and the memory I/F 13-0 through memory I/F 13-N are coupled via a DRI address bus and a DRI data bus. The arbiter 4 monitors an access request from the DRI0 (12-0) through DRI2 (12-2) to the memory block 0 (3-0) through memory block N (3-N). When an access request conflicts, the arbiter 4 arbitrates the access request, and outputs an address after arbitration and data, via the DRI address bus and the DRI data bus, respectively. The bus controller 14 receives, from the CPU 11 and the arbiter 4, an access request to the memory block 0 (3-0) through memory block N (3-N), and controls the buses.

In response to the access request from the CPU 11 and the arbiter 4, the memory I/F 13-0 through memory I/F 13-N read out the image data from the memory block 0 (3-0) through memory block N (3-N), and write the image data to the memory block 0 (3-0) through memory block N (3-N).

Figure 2:
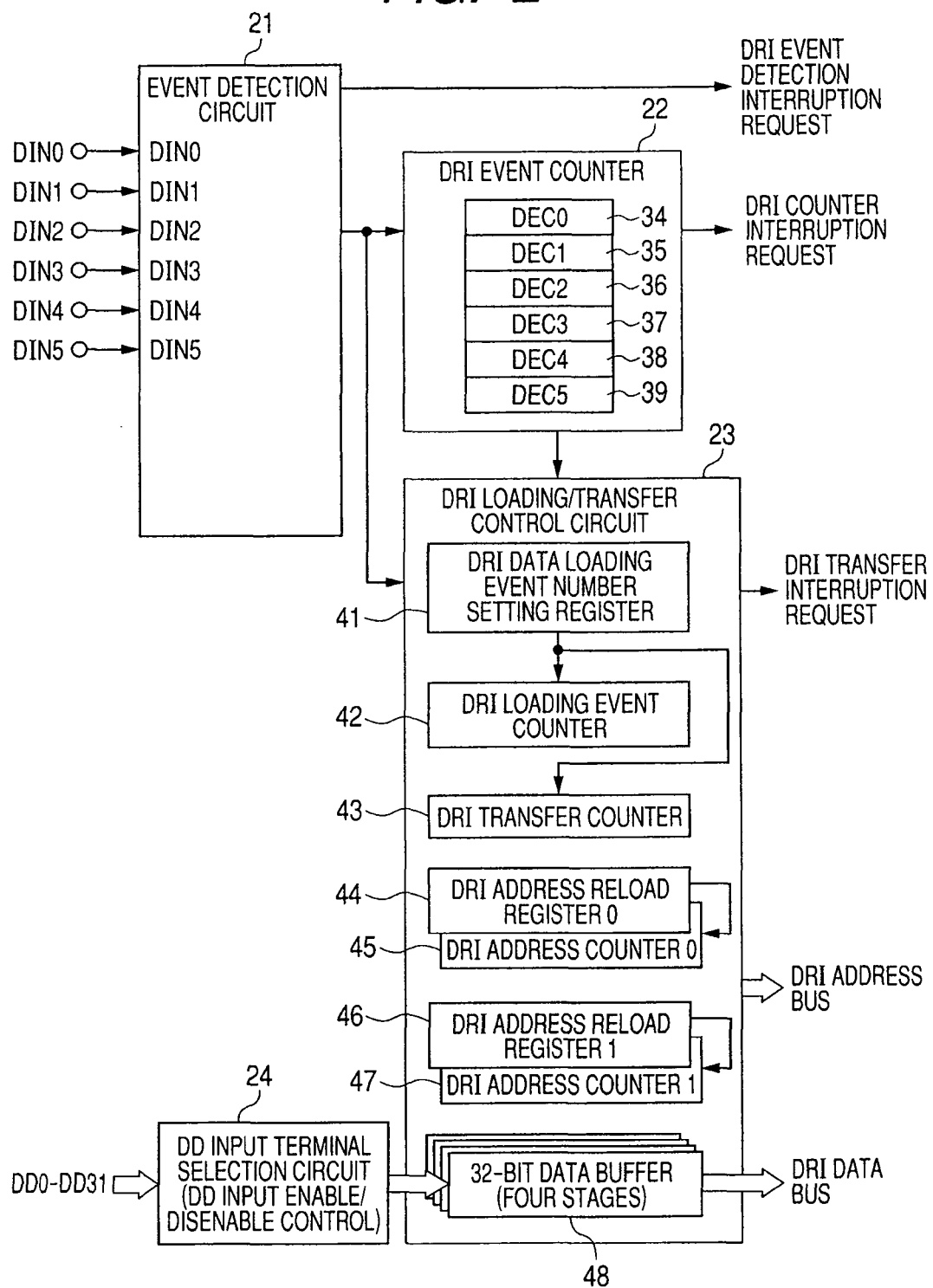
FIG. 2 is a block diagram illustrating internal configuration of a DRI illustrated in FIG. 1.

FIG. 2 is a block diagram illustrating internal configuration of a DRI illustrated in FIG. 1. The present DRI includes an event detection circuit 21, a DRI event counter 22, a DRI loading/transfer control circuit 23, and a DD input terminal selection circuit 24.

The event detection circuit 21 receives a signal inputted from the exterior via a DIN0 terminal through a DIN5 terminal, and detects an event. When the camera 2 is coupled to the DIN0 terminal through DIN5 terminal, for example, the present event is edge detection of a vertical synchronization (VSYNC) signal, edge detection of a horizontal synchronization (HSYNC) signal, detection of a clock (PCLK) signal, etc. As described later, when the camera 2 is coupled, the VSYNC signal is coupled to the DIN0 terminal, the HSYNC signal is coupled to the DIN1 terminal, the PCLK signal is coupled to the DIN3 terminal, and the other DIN2 terminal, DIN4 terminal, and DIN5 terminal are not used.

The DRI event counter 22 has six DECs (DRI Event Counters), and counts an event detected by the event detection circuit 21 by switching suitably coupling of the DEC0 (34) through DEC5 (39). Details of the DRI event counter 22 are described later.

Responding to a signal outputted from the DRI event counter 22, the DRI loading/transfer control circuit 23 loads data inputted from the exterior and writes the loaded data into the memory block 0 (3-0) through memory block N (3-N).

The DRI loading/transfer control circuit 23 includes a DRI data loading event number setting register 41, a DRI loading event counter 42, a DRI transfer counter 43, a DRI address reload register 0 (44), a DRI address counter 0 (45), a DRI address reload register 1 (46), a DRI address counter 1 (47), and a 32-bit data buffer 48.

The DRI data loading event number setting register 41 sets up an event number to perform data loading, and the set-up value is used as a reload value of the DRI loading event counter 42 and the DRI transfer counter 43.

The DRI loading event counter 42 counts a data loading event, and when the data loading state changes from a data loading disenabled state to a data loading enabled state, the setting value of the DRI data loading event number setting register 41 is reloaded. Then, every time when the data loading is performed, the DRI loading event counter 42 decrements the count value by one, and halts the count operation when the count value becomes zero.

The DRI transfer counter 43 counts DRI transfer data loading, and when the data loading state changes from a data loading disenabled state to a data loading enabled state, a value, which is determined based on the setting value of the DRI data loading event number setting register 41 and a bus width of data inputted from the exterior, is reloaded as the count value. Then, every time when the DRI transfer is completed, the DRI transfer counter 43 decrements the count value by one. When the count value becomes zero, the DRI transfer counter 43 halts the count operation and notifies the CPU 11 that the DRI transfer has completed, by outputting a DRI transfer interruption request signal.

The DRI transfer is executed every four times of data loading events when the bus width of data inputted from the exterior is 8 bits, every two times of data loading events when the bus width of data is 16 bits, and every time of data loading event when the bus width of data is 32 bits. This is because the DRI transfers data in units of 32 bits to the memory block 0 (3-0) through memory block N (3-N).

The DRI address reload register 0 (44) stores a reload value of the DRI address counter 0 (45), and this value is used as a start address of the DRI transfer. The setting value is reloaded to the DRI address counter 0 (45) at a predetermined timing.

The DRI address counter 0 (45) specifies an address of the memory block 0 (3-0) through memory block N (3-N) as a DRI transfer destination, and increments the address by four every time when the DRI transfer is completed.

The DRI address reload register 1 (46) and the DRI address counter 1 (47) have equivalent functions as the DRI address reload register 0 (44) and the DRI address counter 0 (45). For example, when the memory is formed as a two-bank configuration, respective addresses can be specified.

The 32-bit data buffer 48 is provided to hold temporarily data inputted from the exterior. When the data amounts to 32 bits, the DRI transfer is performed, and the data is outputted to the memory block 0 (3-0) through memory block N (3-N) via the DRI data bus (a bus in the microcomputer 1 illustrated in FIG. 1) and the memory I/F 13.

The DD input terminal selection circuit 24 selects one of 8 bits, 16 bits, and 32 bits in the DD0-DD31 input terminal, and outputs to the 32-bit data buffer 48. When the bus width of data inputted from the exterior is 8 bits, setting is made so as to select input terminals to which the 8-bit data is inputted. When the bus width of data inputted from the exterior is 16 bits, setting is made so as to select input terminals to which the 16-bit data is inputted. When the bus width of data inputted from the exterior is 32 bits, setting is made so as to select all of the DD0-DD31 input terminals.

Figure 3:
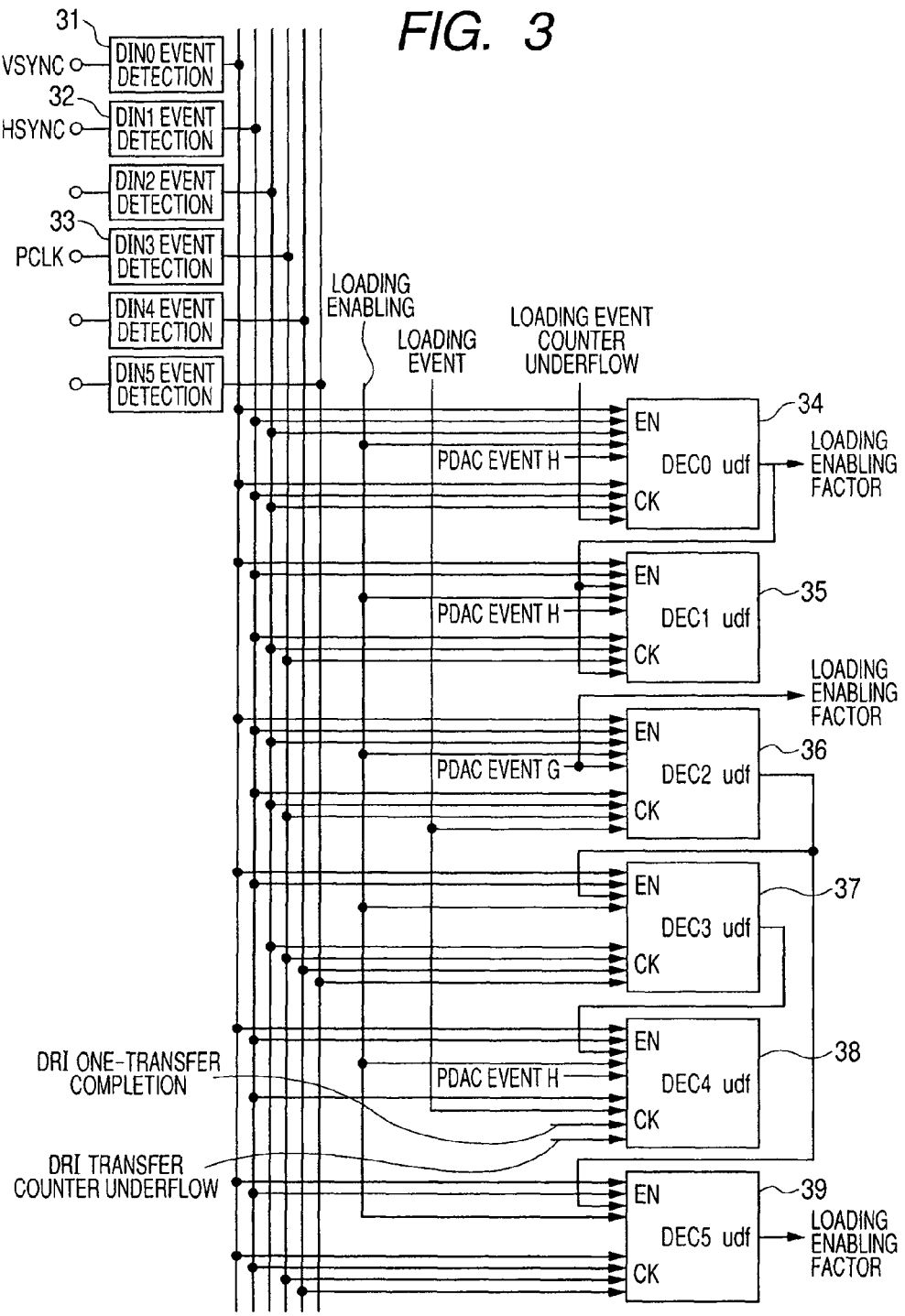
FIG. 3 is a block diagram for explaining details of an event detection circuit 21 and a DRI event counter 22.

FIG. 3 is a block diagram for explaining details of the event detection circuit 21 and the DRI event counter 22.

The event detection circuit 21 is comprised of six circuits of a DIN0 event detection circuit through a DIN5 event detection circuit. Upon detecting either of a rising edge and a falling edge, or both edges of a signal inputted, the event detection circuit 21 generates an event. In the present embodiment, three circuits of the DIN0 event detection circuit 31, the DIN1 event detection circuit 32, and the DIN3 event detection circuit 33 are used.

A VSYNC signal from the camera 2 is inputted into the DIN0 event detection circuit 31. In the present embodiment, it is assumed that the DIN0 event detection circuit 31 generates an event at a rising edge of the VSYNC signal.

An HSYNC signal from the camera 2 is inputted into the DIN1 event detection circuit 32. In the present embodiment, it is assumed that the DIN1 event detection circuit 32 generates an event at a falling edge of the HSYNC signal.

A PCLK signal from the camera 2 is inputted into the DIN3 event detection circuit 33. In the present embodiment, it is assumed that the DIN3 event detection circuit 33 generates an event at a falling edge of the PCLK signal.

Each of the DEC0 (34) through DEC5 (39) decrements the count value by one synchronizing with a CK signal, when the counting is enabled by an EN signal. Each of the DEC0 (34) through DEC5 (39) selects one from four or five signals, and uses it as the EN signal. Each of the DEC0 (34) through DEC5 (39) selects one from four signals, and uses it as the CK signal.

For example, the DEC0 (34) selects one of the followings and uses it as the EN signal, that is, one of an event generated at a rising edge of the VSYNC signal, an event generated at a falling edge of the HSYNC signal, an event detected by the DIN2 event detection circuit (not used), a loading enabling signal, and a PDAC event H signal. The DEC0 (34) also selects one of the followings and uses it as the CK signal, that is, one of an event generated at a rising edge of the VSYNC signal, an event generated at a falling edge of the HSYNC signal, an event detected by the DIN2 event detection circuit (not used), and a loading event counter underflow signal.

The DEC0 (34) outputs a udf signal to the DEC1 (35) of the next stage, when an underflow occurs. This signal is used also as a loading enabling factor used when determining loading enabling of data from the camera 2.

The DEC1 (35) selects one of the followings and uses it as the EN signal, that is, one of an event generated at a rising edge of the VSYNC signal, an event generated at a falling edge of the HSYNC signal, a udf signal outputted from the DEC0 (34), a loading enabling signal, and a PDAC event H signal. The DEC1 (35) selects one of the followings and uses it as the CK signal, that is, one of an event generated at a falling edge of the HSYNC signal, an event detected by the DIN2 event detection circuit (not used), a PCLK signal, and a udf signal outputted from the DEC0 (34).

In FIG. 3, a loading enabling signal is issued from the exterior by software etc. to direct loading enabling. A loading event counter underflow signal indicates that an underflow has occurred in the DRI loading event counter 42. A DRI one-transfer completion signal is outputted every time when one DRI transfer is completed. A DRI transfer counter underflow signal indicates that an underflow has occurred in the DRI transfer counter 43. Since these signals have no direct relation with the present embodiment, the detailed explanation thereof is omitted.

Figure 4:
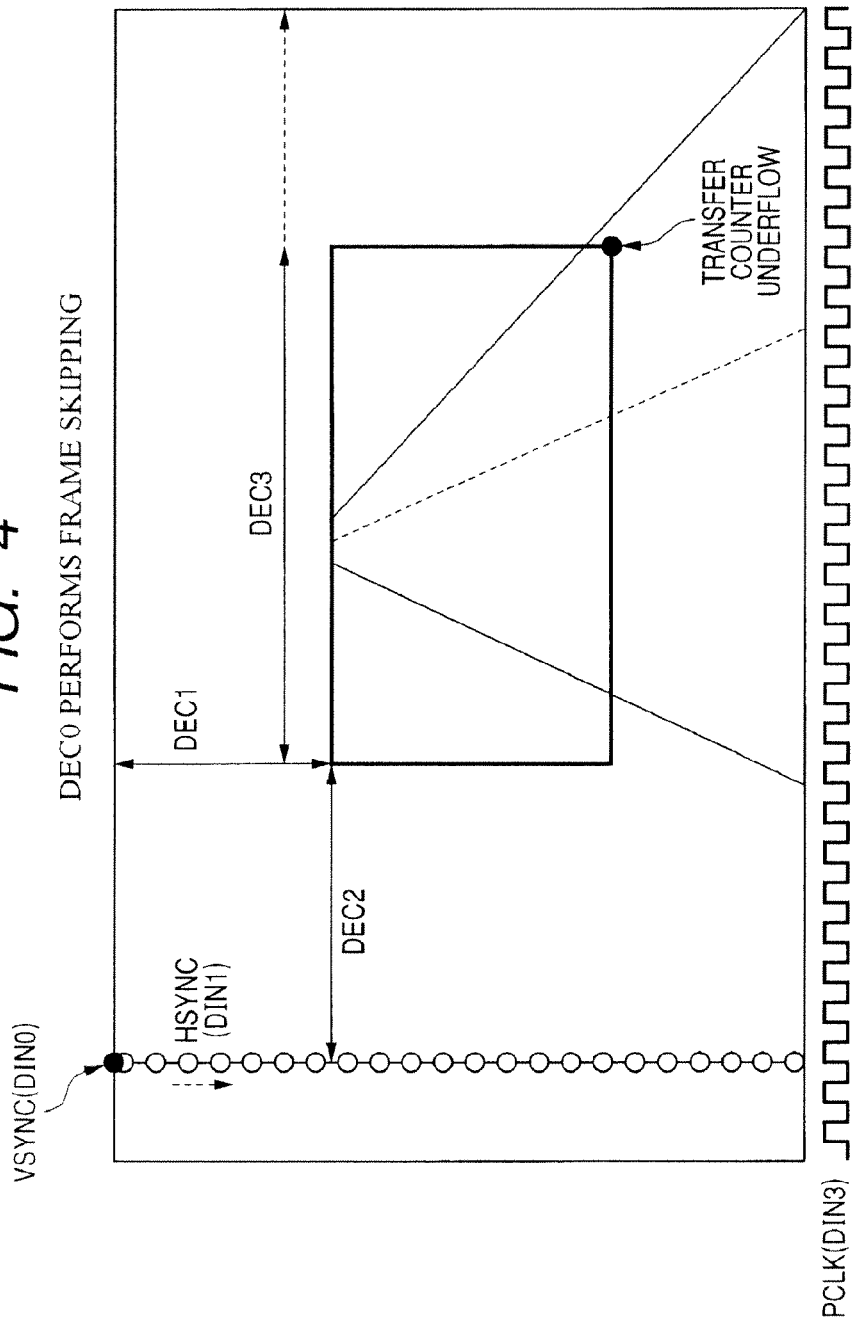
FIG. 4 is a drawing illustrating an example of loading of image data using the DRI illustrated in FIG. 2.
Figure 5:
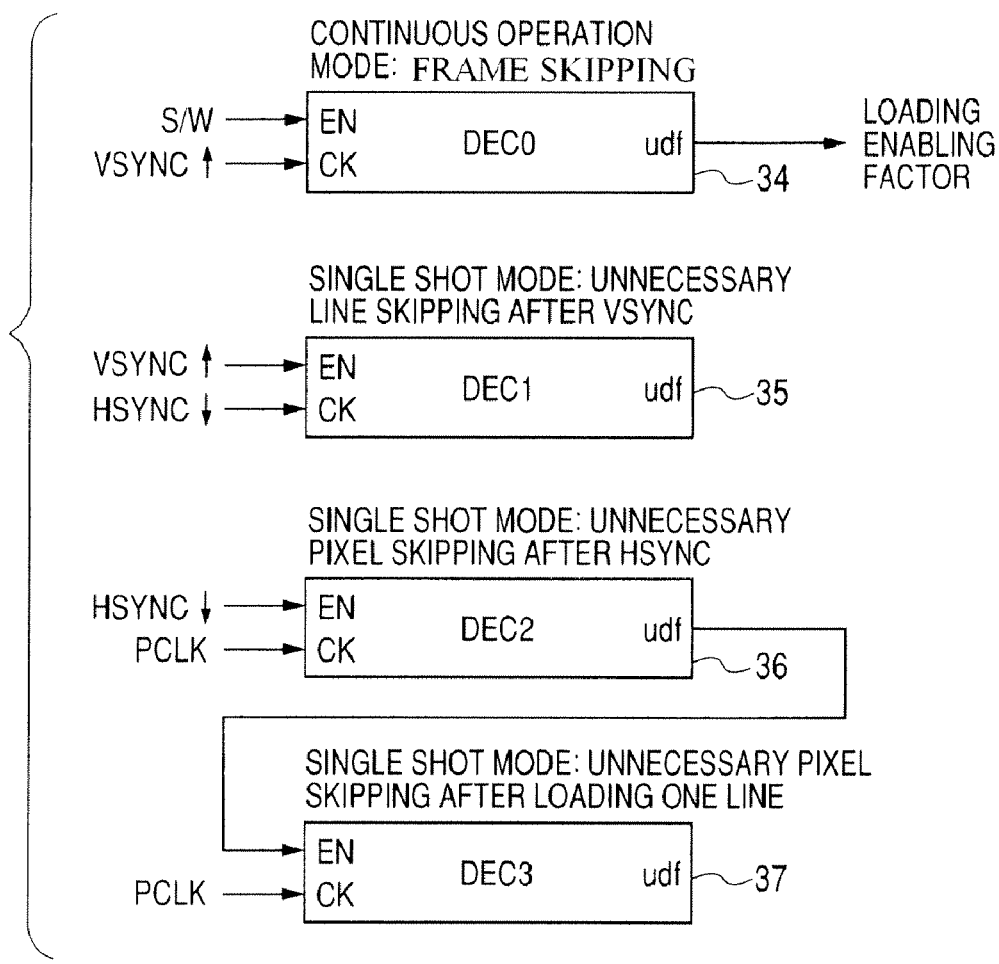
FIG. 5 is a drawing for explaining operation of a DEC0 (34) through a DEC5 (39) illustrated in FIG. 3.

FIG. 4 is a drawing illustrating an example of loading of image data using the DRI illustrated in FIG. 2. FIG. 5 is a drawing for explaining operation of the DEC0 (34) through DEC5 (39) illustrated in FIG. 3. As illustrated in FIG. 4, when image data of a square area is loaded, the DEC4 (38) and the DEC5 (39) are not used.

When capturing an image of the square area illustrated in FIG. 4, the DEC0 (34) performs frame skipping first. As illustrated in FIG. 5, an S/W (loading enabling) signal is selected as the EN signal of the DEC0 (34), and an event generated at a rising of the VSYNC signal is selected as a CK signal. The DEC0 (34) performs down count by an event generated at rising of the VSYNC signal when the count is enabled by software, and reloads a reload value at a predetermined timing. Then loading of the image data is enabled by the underflow (the udf signal) of the DEC0 (34).

For example, when the reload value is "H'0001", the frame skipping is performed every other frame. The continuous operation mode reloads a reload value by an underflow of the DEC0 (34).

Next, skipping of an unnecessary line is performed by the DEC1 (35). As illustrated in FIG. 5, an event generated at a rising of the VSYNC signal is selected as the EN signal of the DEC1 (35), and an event generated at a falling of the HSYNC signal is selected as the CK signal. When the count is enabled by an event generated at a rising of the VSYNC signal, the DEC1 (35) reloads a reload value at a predetermined timing and performs down count by an event generated at a falling of the HSYNC signal. Then, loading of the image data is enabled by an underflow of the DEC1 (35). A single shot mode halts a count operation by an underflow of the DEC1 (35), and the DEC1 (35) reloads a reload value when the count is enabled again.

Next, skipping of an unnecessary pixel is performed by the DEC2 (36). As illustrated in FIG. 5, an event generated at a falling of the HSYNC signal is selected as the EN signal of the DEC2 (36), and an event generated at a falling of the PCLK signal is selected as the CK signal. When the count is enabled by an event generated at a falling of the HSYNC signal, the DEC2 (36) reloads a reload value at a predetermined timing, and performs down count by an event generated at a falling of the PCLK signal. Then, the count of the DEC3 (37) is enabled by an underflow of the DEC2 (36).

Next, the DEC3 (37) performs loading of the image data for one line and skipping of an unnecessary pixel after the loading of the image data. As illustrated in FIG. 5, a udf signal of the DEC2 (36) is selected as the EN signal of the DEC3 (37), and an event generated at a falling of the PCLK signal is selected as the CK signal. When the count is enabled by the udf signal outputted from the DEC2 (36), the DEC3 (37) reloads a reload value at a predetermined timing, and performs down count by an event generated at a falling of the PCLK signal. The DEC3 (37) enables loading of the image data when the count is enabled by the udf signal outputted from the DEC2 (36), and disenables the loading of the image data by an underflow of the DEC3 (37).

The DRI loading/transfer control circuit 23 generates a DRI data loading event by a loading enabling factor of the image data outputted from the DEC0 (34) through DEC3 (37), and performs an internal operation.

Figure 6:
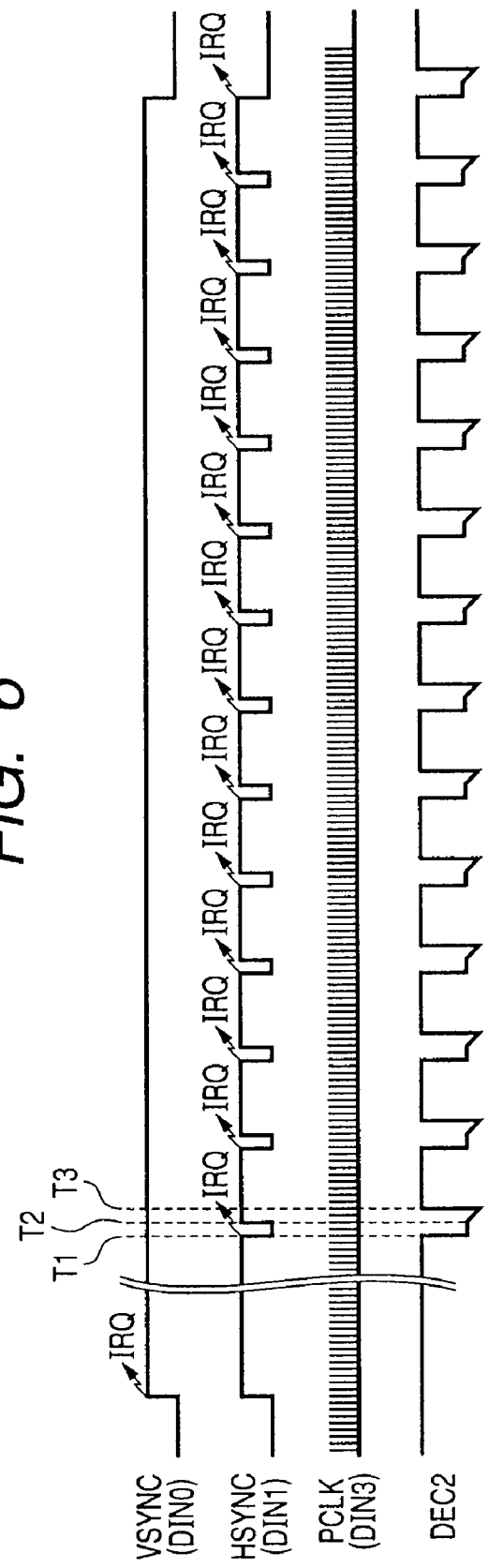
FIG. 6 is a timing chart for explaining a VSYNC signal, an HSYNC signal, and a PCLK signal, which are inputted into terminals of a DIN0, a DIN1, and a DIN3, and operation of the DEC2 (36)

FIG. 6 is a timing chart for explaining a VSYNC signal, an HSYNC signal, and a PCLK signal, which are inputted into terminals of a DIN0, a DIN1, and a DIN3, and operation of the DEC2 (36).

The DIN0 event detection circuit 31 generates an event at a rising of the VSYNC signal, and outputs the event to the DRI event counter 22. At this time, it is possible to output an interrupt signal which notifies the CPU 11 that a rising of the VSYNC signal has occurred.

The DIN1 event detection circuit 32 generates an event at a falling of the HSYNC signal, and outputs the event to the DRI event counter 22. At this time, it is possible to output an interrupt signal which notifies the CPU 11 that a falling of the HSYNC signal has occurred.

The DIN3 event detection circuit 33 generates an event at a falling of the PCLK signal, and outputs the event to the DRI event counter 22.

When an interrupt occurs at a falling of the HSYNC signal at T1 in FIG. 6, the CPU 11 determines whether the succeeding line is a line to be loaded or not. This determining is performed depending on whether it is after an unnecessary line is skipped by the DEC1 (35). When the succeeding line is a line to be loaded, the CPU 11 changes the loading state from a loading disenabled state to a loading enabled state. At this time, the DEC2 (36) reloads a reload value.

When a falling edge of the HSYNC signal is detected at T1, the DEC2 (36) starts counting and performs down count at a falling edge of the PCLK signal. When an underflow of the DEC2 (36) occurs at T3, the DEC2 (36) outputs a udf signal to the DEC3 (37) to make the DEC3 (37) start counting.

Figure 7:
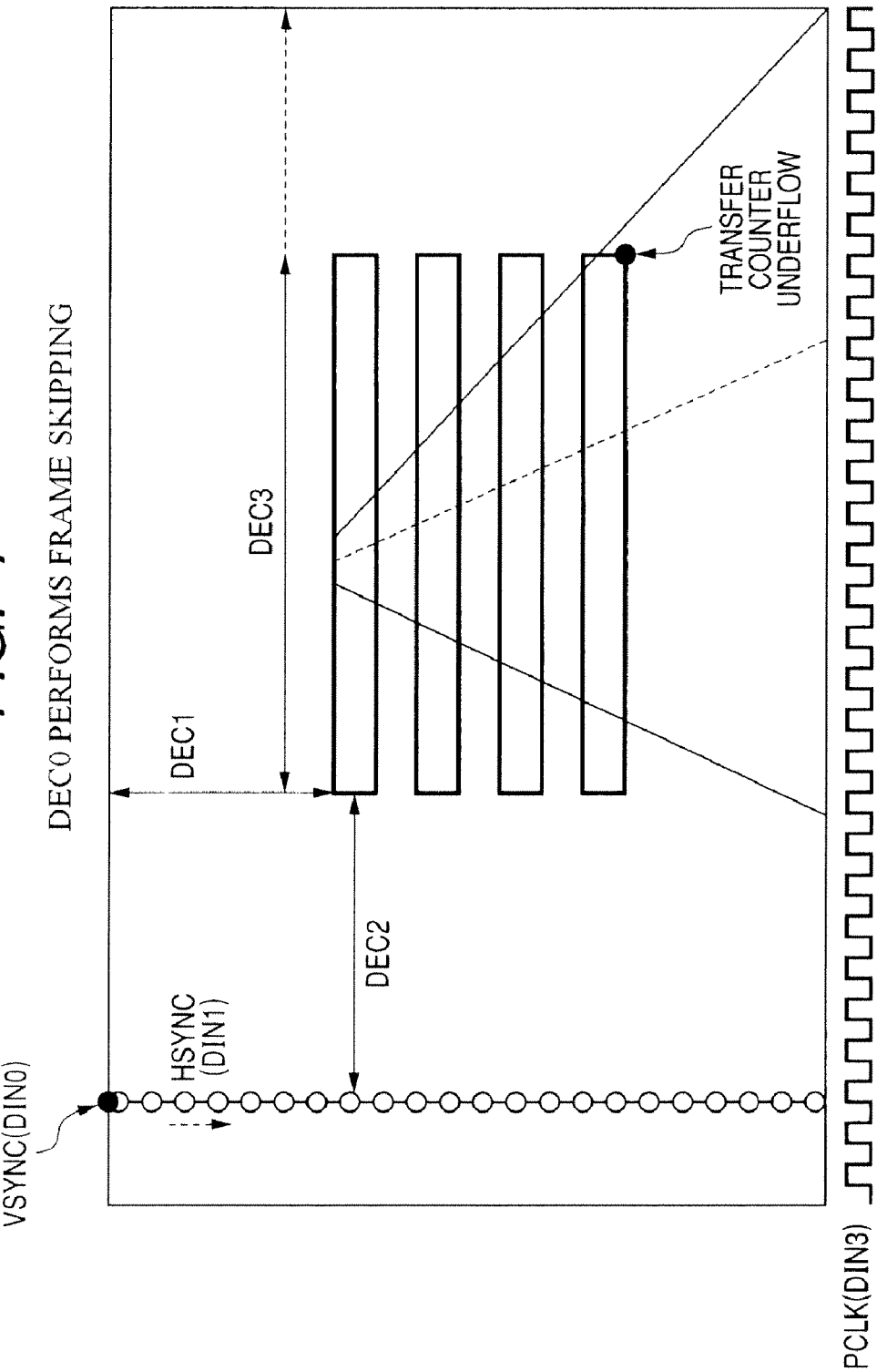
FIG. 7 is a drawing illustrating another example of loading of image data using the DRI illustrated in FIG. 2.
Figure 8:
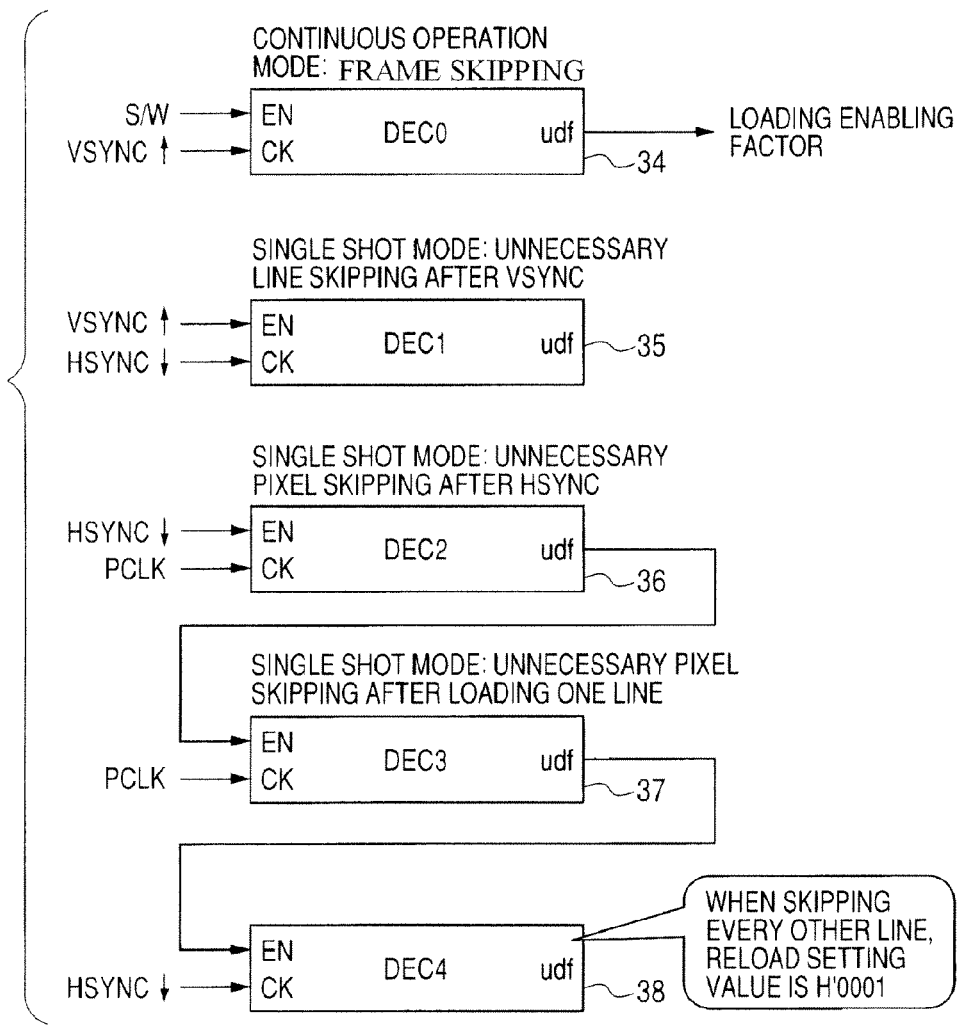
FIG. 8 is a drawing for explaining another example of operation of the DEC0 (34) through DEC5 (39) illustrated in FIG. 3.

FIG. 7 is a drawing illustrating another example of loading of image data using the DRI illustrated in FIG. 2. FIG. 8 is a drawing for explaining another example of operation of the DEC0 (34) through DEC5 (39) illustrated in FIG. 3. When loading the image data in every other line as illustrated in FIG. 7, the DEC5 (39) is not used.

When loading the image data in every other line as illustrated in FIG. 7, the DEC0 (34) performs frame skipping first. Next, skipping of an unnecessary line is performed by the DEC1 (35) and skipping of an unnecessary pixel is performed by the DEC2 (36). Next, the DEC3 (37) performs loading of the image data for one line and skipping of an unnecessary pixel after the image data loading. These operations are the same as the operation explained with reference to FIG. 5.

Further, skipping of every other line is performed by the DEC4 (38). As illustrated in FIG. 8, a udf signal of the DEC3 (37) is selected as the EN signal of the DEC4 (38), and an event generated at a falling of the PCLK signal is selected as the CK signal. When the count is enabled by the udf signal outputted from the DEC3 (37), the DEC4 (38) performs the down count by an event generated at a falling of the HSYNC signal, and reloads a reload value at a predetermined timing. For example, when the reload value is "H'0001", the line skipping is performed every other line.

The DRI loading/transfer control circuit 23 generates a DRI data loading event by a loading enabling factor of the image data outputted from the DEC0 (34) through DEC4 (38), and performs an internal operation.

Figure 9:
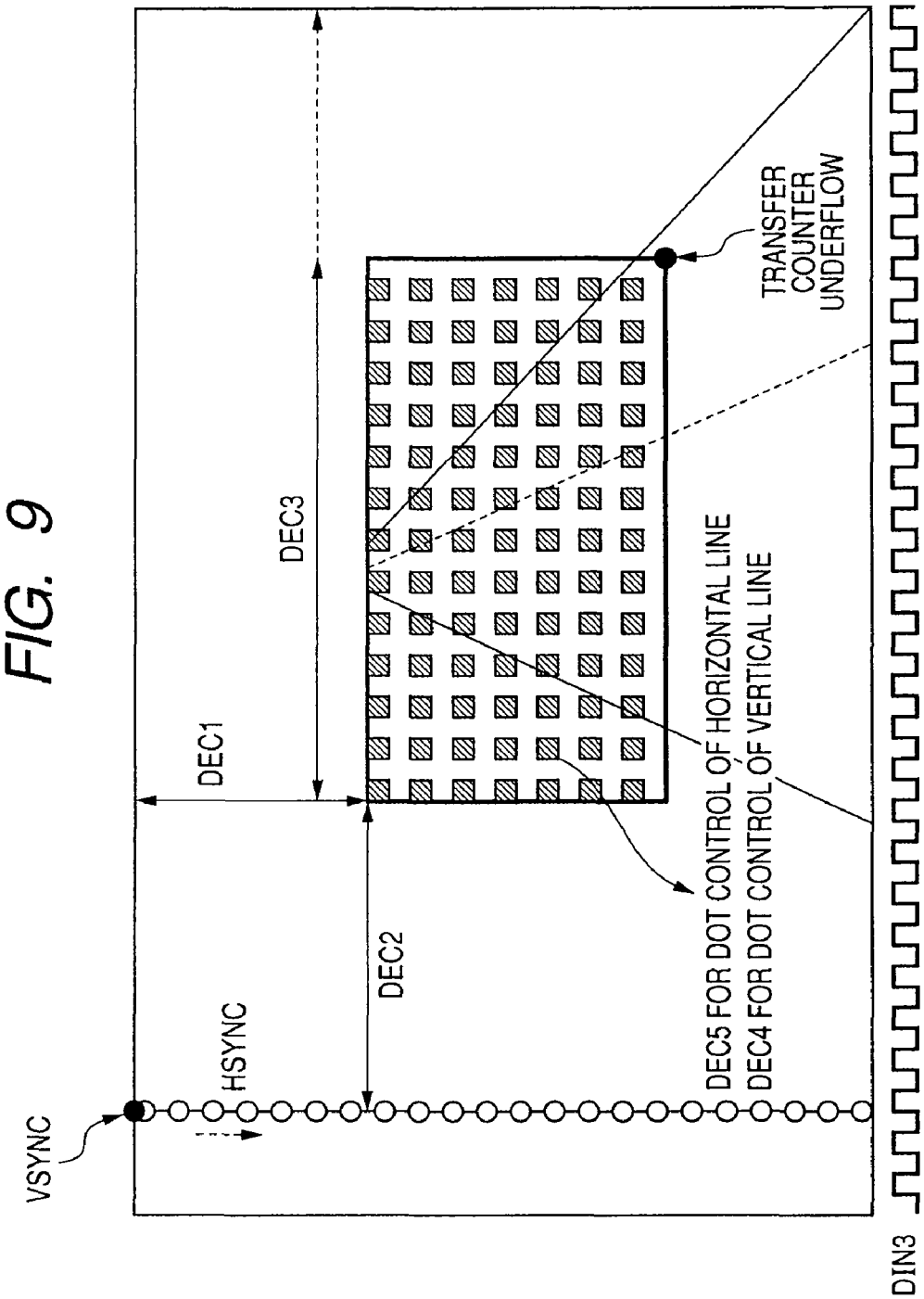
FIG. 9 is a drawing illustrating a further another example of loading of image data using the DRI illustrated in FIG. 2.
Figure 10:
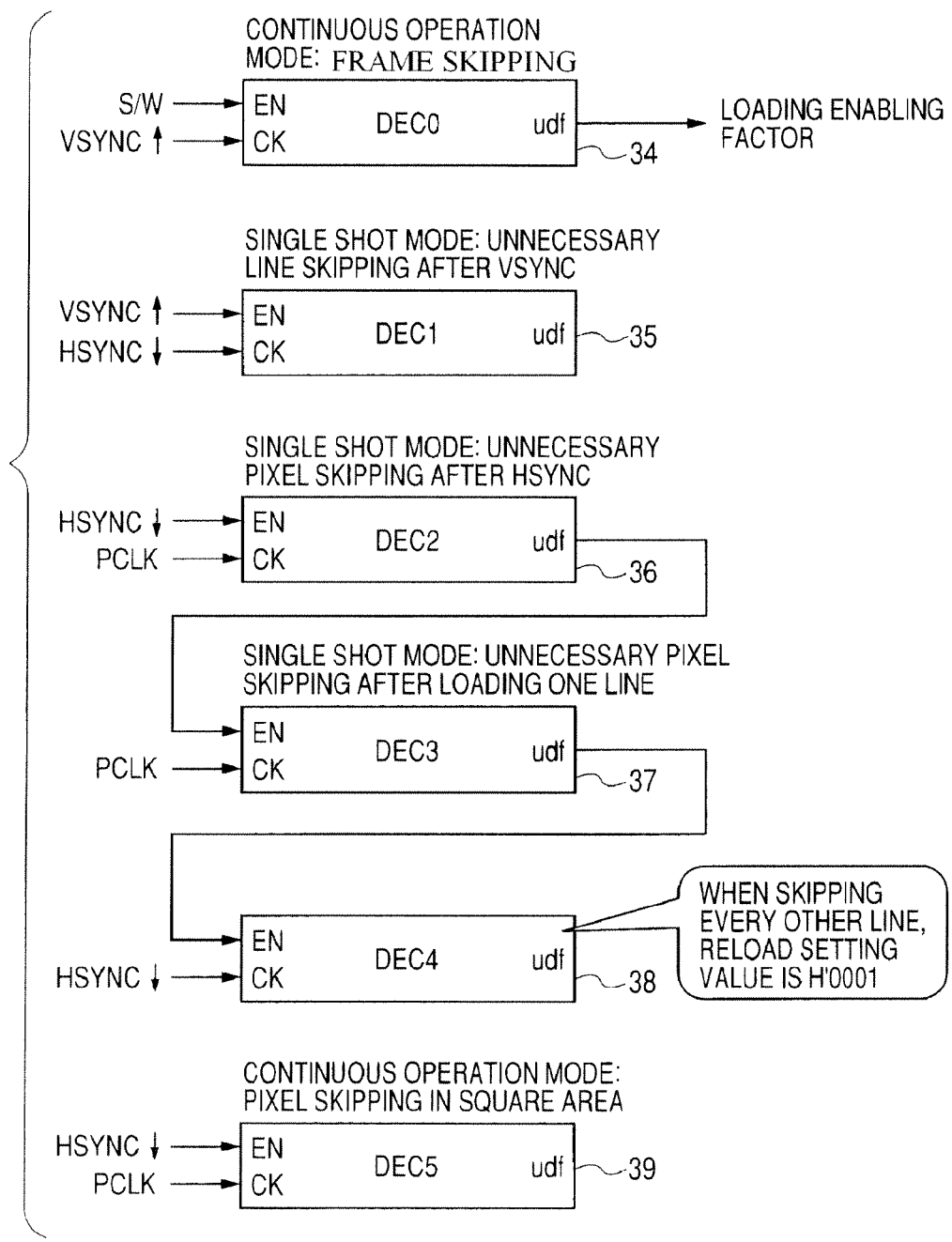
FIG. 10 is a drawing for explaining a further another example of operation of the DEC0 (34) through DEC5 (39) illustrated in FIG. 3.

FIG. 9 is a drawing illustrating a further another example of loading of image data using the DRI illustrated in FIG. 2. FIG. 10 is a drawing for explaining a further another example of operation of the DEC0 (34) through DEC5 (39) illustrated in FIG. 3.

When capturing an image in every other line and every other pixel in a square area as illustrated in FIG. 9, the DEC0 (34) performs frame skipping first. Next, skipping of an unnecessary line is performed by the DEC1 (35) and skipping of an unnecessary pixel is performed by the DEC2 (36). The DEC3 (37) performs loading of the image data for one line and skipping of an unnecessary pixel after the image data loading. Then, skipping in every other line is performed by the DEC4 (38). These operations are the same as the operation explained with reference to FIG. 8.

Further, skipping in every other pixel is performed by the DEC5 (39). As illustrated in FIG. 10, an event generated at a falling of the HSYNC signal is selected as the EN signal of the DEC5 (39), and an event generated at a falling of the PCLK signal is selected as the CK signal. When the count is enabled by an event generated at a falling of the HSYNC signal, the DEC5 (39) performs the down count by an event generated at a falling of the PCLK signal, and reloads a reload value at a predetermined timing. Then loading of the image data is enabled by the underflow (the udf signal) of the DEC5 (39).

For example, when the reload value is "H'0001", the pixel skipping is performed in every other pixel.

The DRI loading/transfer control circuit 23 generates a DRI data loading event by a loading enabling factor of the image data outputted from the DEC0 (34) through DEC5 (39), and performs an internal operation.

Figure 11:
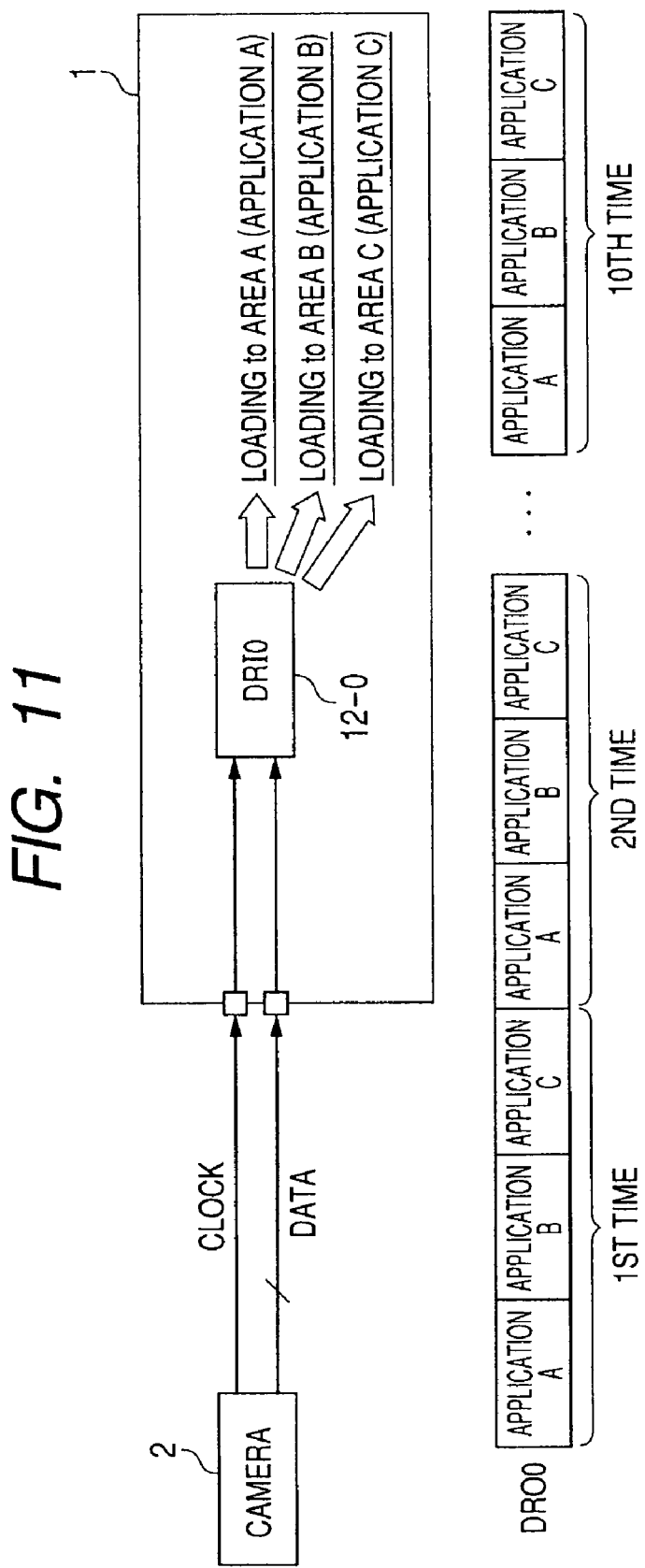
FIG. 11 is a drawing for explaining a problem in a case of loading image data of three areas using only one DRI.

FIG. 11 is a drawing for explaining a problem in a case of loading image data of three areas using only one DRI. For example, when image data of an area A is used in Application A, image data of an area B is used in Application B, and image data of an area C is used in Application C, it is necessary to transfer image data from a camera 2 to the memory block 0 (3-0) through memory block N (3-N) in chronological order. For example, in a certain frame, the image data of the area A is loaded and transferred to the memory block 0 (3-0) through memory block N (3-N); in the following frame, the image data of the area B is loaded and transferred to the memory block 0 (3-0) through memory block N (3-N); and in the subsequently following frame, the image data of the area C is loaded and transferred to the memory block 0 (3-0) through memory block N (3-N). In this case, every time when the image data is loaded, it is necessary to perform a complicated control of changing the address of the memory block 0 (3-0) through memory block N (3-N).

There may be a method in which all image data from the camera 2 are once loaded and stored in the memory block 0 (3-0) through memory block N (3-N), and image data used by Application A through Application C are cut out respectively. However, the CPU 11 needs to retrieve and process necessary image data, leading to lowering in processing capacity of the entire system.

Figure 12:
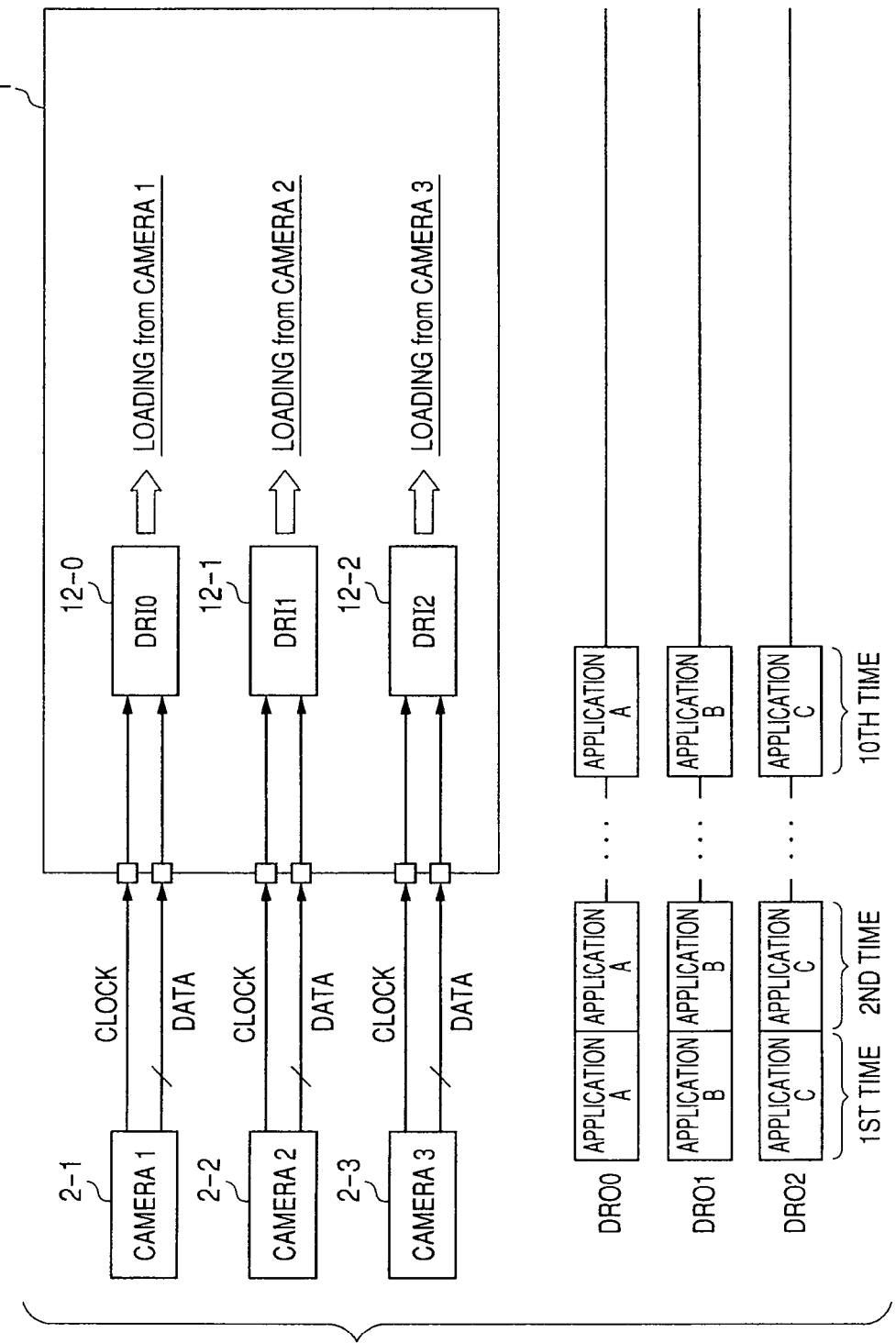
FIG. 12 is a drawing for explaining a problem in a case of loading image data of three areas using three cameras (camera 1 (2-1) through camera 3 (2-3)), and three DRIs (DRI0 (12-0) through DRI2 (12-2))

FIG. 12 is a drawing for explaining a problem in a case of loading image data of three areas using three cameras (camera 1 (2-1) through camera 3 (2-3)), and three DRIs (DRI0 (12-0) through DRI2 (12-2)). The DRI0 (12-0) loads image data to be used by Application A from the camera 1 (2-1), the DRI1 (12-1) loads image data to be used by Application B from the camera 2 (2-2), and the DRI2 (12-2) loads image data to be used by Application C from the camera 3 (2-3). In this case, each image data can be loaded as parallel data.

However, the microcomputer 1 is needed to have plural data input terminals and plural clock input terminals; accordingly, there is a problem that a package miniaturization and a pin miniaturization become difficult. Since plural cameras, that is, the camera 1 (2-1) through camera 3 (2-3), are used, there is also a problem that leads to increase of cost of the entire system.

Therefore, the system according to the present embodiment employs configuration that three pieces of the DRI0 (12-0) through DRI2 (12-2) load image data from one piece of the camera 2 as illustrated in FIG. 1.

FIG. 13 is a drawing illustrating an example of a loading timing of image data by the microcomputer 1 according to the first embodiment of the present invention. The DRI0 (12-0) loads image data to be used by Application A, and transfers it to the memory block 0 (3-0) through memory block N (3-N). The DRI1 (12-1) loads image data to be used by Application B, and transfers it to the memory block 0 (3-0) through memory block N (3-N). The DRI2 (12-2) loads image data to be used by Application C, and transfers it to the memory block 0 (3-0) through memory block N (3-N).

As illustrated in FIG. 13, in a case where each of the DRI0 (12-0) through DRI2 (12-2) loads image data and transfers the loaded image data to the memory block 0 (3-0) through memory block N (3-N), even when the image data overlaps with image data to be used by the other applications, special control is not required but image data to be used by each application can be transferred to areas with continued addresses of the memory block 0 (3-0) through memory block N (3-N).

Figure 14B:
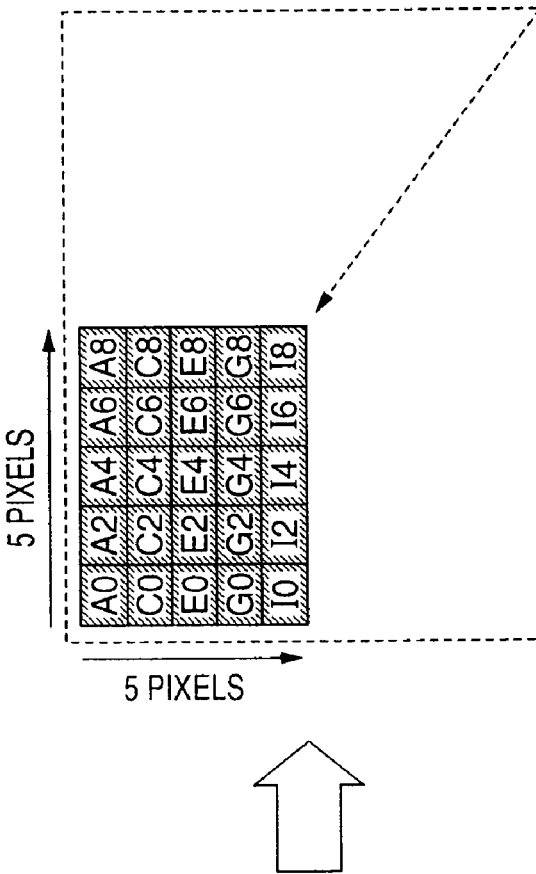
FIG. 14 is a drawing for explaining loading of image data employed by Application A.
Figure 14A:
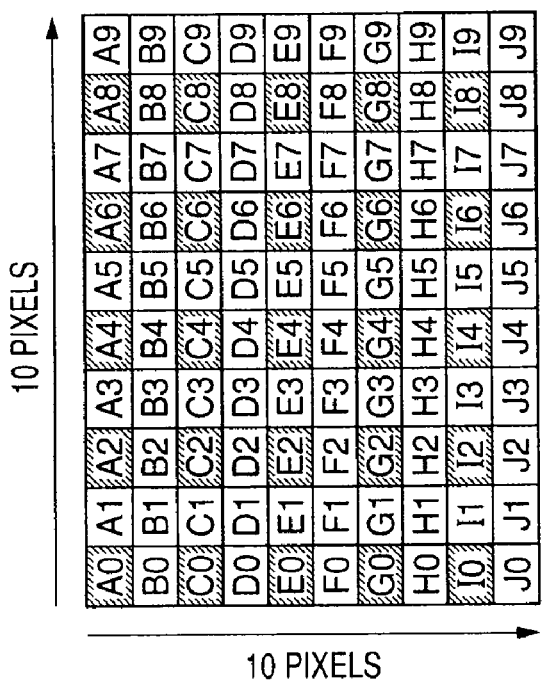

FIG. 14 is a drawing for explaining loading of image data employed by Application A. Loading of the image data to be used by Application A is performed by the DRI0 (12-0). As illustrated in FIG. 14(a), when line skipping in every other line and pixel skipping in every other pixel are performed, the DEC0 (34) through the DEC5 (39) of the DRI0 (12-0) are controlled as explained with reference to FIG. 10. As illustrated in FIG. 14(b), the image data of 10 pixels×10 lines is reduced to the image data of 5 pixels×5 lines, and stored in the memory block 0 (3-0) through memory block N (3-N).

Figures 15A, 15B:
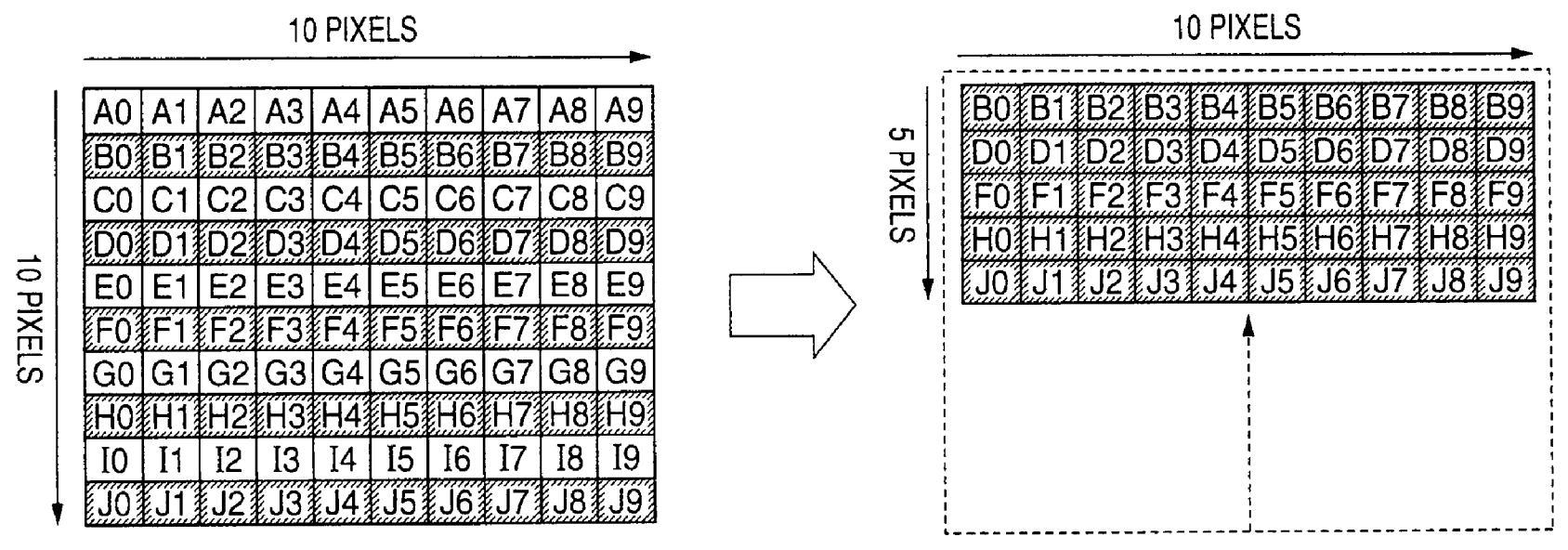

FIG. 15 is a drawing for explaining loading of image data employed by Application B. Loading of the image data to be used by Application B is performed by the DRI1 (12-1). As illustrated in FIG. 15(a), when line skipping in every other line is performed, the DEC0 (34) through the DEC5 (39) of the DRI1 (12-1) are controlled as explained with reference to FIG. 8. As illustrated in FIG. 15(b), the image data of 10 pixels×10 lines is reduced to the image data of 10 pixels×5 lines, and stored in the memory block 0 (3-0) through memory block N (3-N).

Figures 16A, 16B:
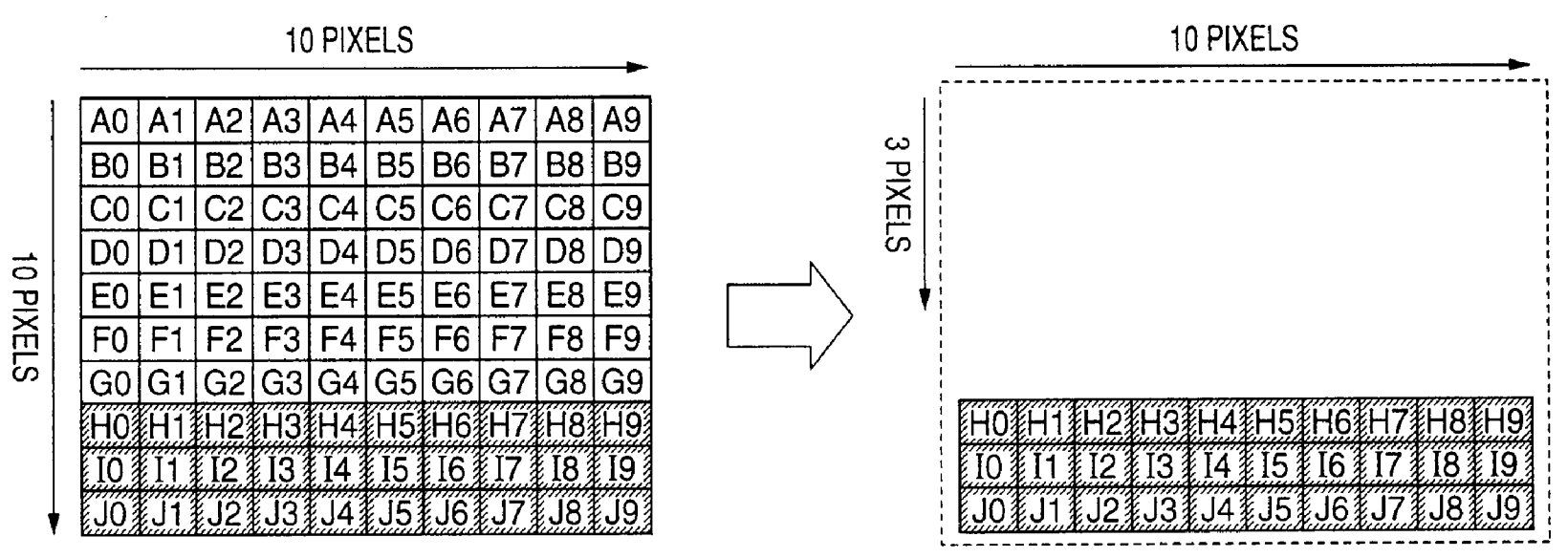

FIG. 16 is a drawing for explaining loading of image data employed by Application C. Loading of the image data to be used by Application C is performed by the DRI2 (12-2). As illustrated in FIG. 16(a), when lower three lines of the image data of 10 pixels×10 lines are extracted, the DEC0 (34) through the DEC5 (39) of the DRI2 (12-2) are controlled as explained with reference to FIG. 5. As illustrated in FIG. 16(b), the image data of 10 pixels×3 lines is extracted from the image data of 10 pixels×10 lines, and stored in the memory block 0 (3-0) through memory block N (3-N).

FIG. 17 is a drawing illustrating an example of a screen display of image data stored in the memory block 0 (3-0) through memory block N (3-N). The image data of the area A loaded by the DRI0 (12-0) is displayed in the middle of the screen, the image data of the area B loaded by DRI1 (12-1) is displayed on the upper part, and the image data of the area C loaded by DRI2 (12-2) is displayed on the lower part.

The system explained in the present embodiment can be employed, for example, by an application which captures an image by a camera mounted in a vehicle while the vehicle is running, and controls the vehicle depending on a situation. The vehicle can check other vehicles running ahead and obstacles in a wide range by the area A illustrated in FIG. 17, can recognize signs etc. by the area B, and can recognize minutely a white line as a white line detection by the area C.

As explained above, according to the microcomputer in the present embodiment, image data from one piece of the camera 2 is loaded to three pieces of the DRI0 (12-0) through DRI2 (12-2), and transferred to the memory block 0 (3-0) through memory block N (3-N). Therefore, it is possible to load simultaneously the image data of different areas out of the image data taken by the camera 2, and to transfer each image data to areas with continued addresses in the memory block 0 (3-0) through memory block N (3-N).

Since the image data of plural areas of the image data from one piece of the camera 2 can be loaded, it is unnecessary to use plural cameras, therefore, it is possible to reduce cost of the entire system.

Since each of the image data of plural areas is stored in areas with continued addresses in the memory block 0 (3-0) through memory block N (3-N), the image data can be easily retrieved for every application, therefore, the load of the CPU 11 can be reduced.

(Second Embodiment)

Figure 18:
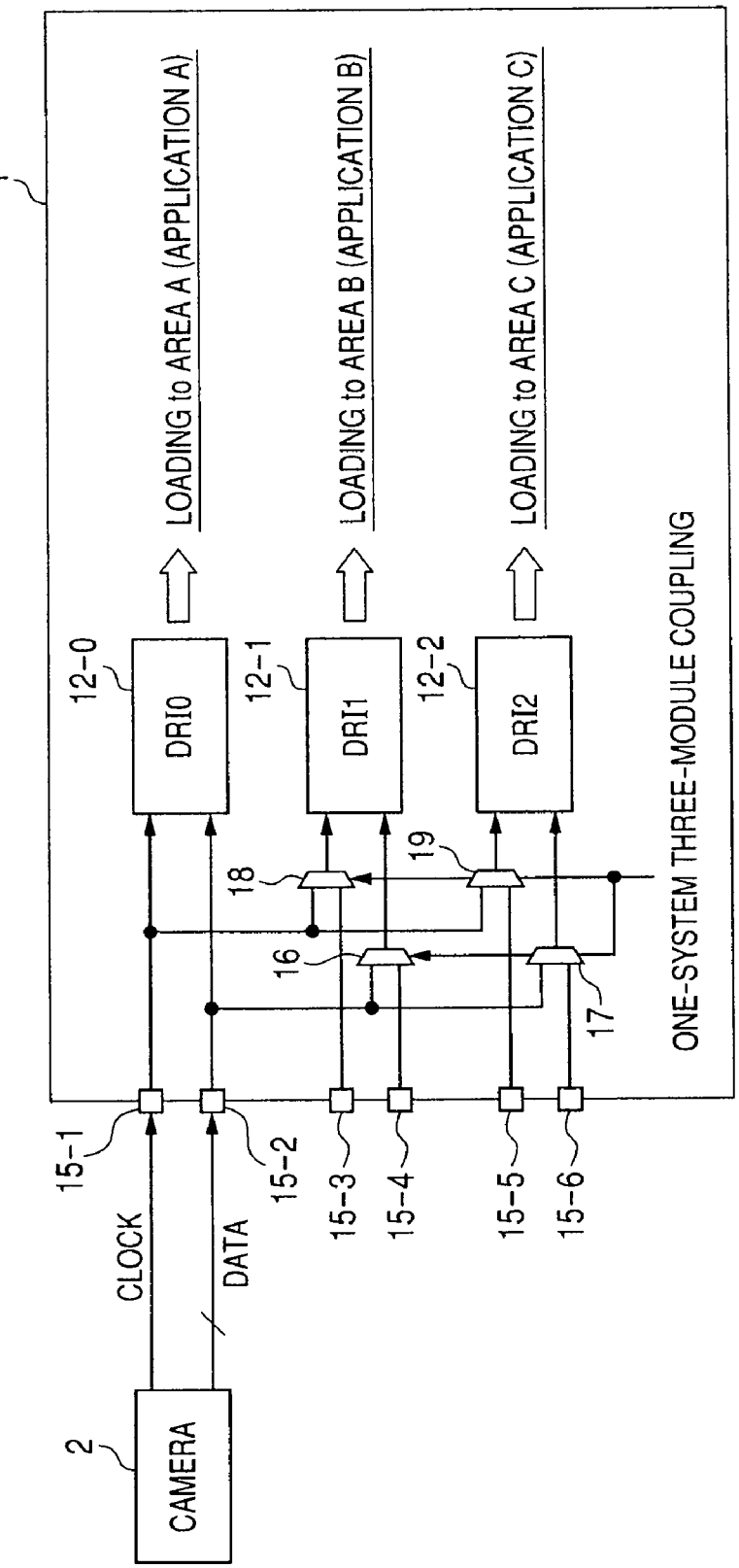
FIG. 18 is a block diagram illustrating an example of configuration of a system including a microcomputer according to a second embodiment of the present invention.

FIG. 18 is a block diagram illustrating an example of configuration of a system including a microcomputer according to a second embodiment of the present invention. As compared with the configuration of the system in the first embodiment illustrated in FIG. 1, the present system differs only in a point that a terminal 15-3 through a terminal 15-6 are added, into which a clock signal and image data for a second and a third camera are inputted, and that a selector 16 through a selector 19 are added. Therefore, detailed explanations of the duplicating configuration and function are not repeated.

The selector 16 outputs selectively, to the DRI1 (12-1), either of image data from the camera 2 inputted via the terminal 15-2, and image data from the second camera (not shown) inputted via the terminal 15-4.

The selector 17 outputs selectively, to the DRI2 (12-2), either of image data from the camera 2 inputted via the terminal 15-2, and image data from the third camera (not shown) inputted via the terminal 15-6.

The selector 18 outputs selectively, to the DRI1 (12-1), either of a clock signal from the camera 2 inputted via the terminal 15-1, and a clock signal from the second camera (not shown) inputted via the terminal 15-3.

The selector 19 outputs selectively, to the DRI2 (12-2), either of a clock signal from the camera 2 inputted via the terminal 15-1, and a clock signal from the third camera (not shown) inputted via the terminal 15-5.

By the selector 16 and the selector 18, the image data and the clock signal from the camera 2 are selected to be outputted to the DRI1 (12-1). By the selector 17 and the selector 19, the image data and the clock signal from the camera 2 are selected to be outputted to the DRI2 (12-2). Accordingly, the system configuration explained in the first embodiment illustrated in FIG. 1 can be realized.

By the selector 16 and the selector 18, the image data and the clock signal from the second camera are selected to be outputted to the DRI1 (12-1). By the selector 17 and the selector 19, the image data and the clock signal from the third camera are selected to be outputted to the DRI2 (12-2). Accordingly, the system configuration illustrated in FIG. 12 can be realized.

By realizing a system configuration corresponding to the second camera and the third camera with switching of the selector 16 through selector 19, it is possible to support application in which the second camera and the third camera are arranged in positions different from the position of the camera 2, and plural pieces of image data in different directions are displayed on a screen.

As explained above, according to the microcomputer in the present embodiment, it is possible to load image data from the second camera and the third camera by switching of the selector 16 through selector 19. Therefore, in addition to the effect explained in the first embodiment, it is possible to support still more diversified applications.

It should be considered that the embodiments disclosed in the present description are only illustrative in all the points and not restrictive. It should be understood that the range of the present invention is indicated not by the explanation described above but by the claims, and that various modifications, combinations, sub-combinations and alterations may occur depending on design requirements and other factors insofar as they are within the equivalent meaning and the scope of the claims.

What is claimed is:

1. A microcomputer for transferring externally inputted data to a storage circuit, the microcomputer comprising:
a plurality of interface means each of which loads data in a prescribed area out of the externally inputted data and transfers the loaded data to the storage circuit; and
a processor which controls the interface means so as to transfer data in respectively different areas out of the externally inputted data to the storage circuit,
wherein each of the interface means loads data in an overlapping area out of the externally inputted data and transfers the loaded data to the storage circuit in parallel,
wherein each of the interface means comprises:
an event detecting means which receives a horizontal synchronizing signal, a vertical synchronizing signal, a data output clock signal externally inputted, and detects an event in one frame data output period according to the horizontal synchronizing signal, the vertical synchronizing signal, and the data output clock signal;
a plurality of counting means each of which counts an event detected by the event detecting means and operable to enable loading of data corresponding to the prescribed area;
a control means which receives data externally inputted, and outputs the data to the storage circuit when one of the counting means outputs an enable signal or stops to output the data when all of the counting means do not output the enable signal; and
an address generating means which generates an address to which the data in the prescribed area outputted by the control means is stored and outputs the generated address to the storage circuit.

2. The microcomputer according to claim 1, further comprising:
a selection means which selects one of the externally inputted data and data different from the externally inputted data, and outputs the selected data to at least one of the interlace means.

3. A system comprising:
a camera which takes an image;
a storage circuit which stores data; and
a microcomputer which transfers image data inputted by the camera to the storage circuit,
wherein the microcomputer includes:
a plurality of interface means each of which loads image data in a prescribed area out of the image data inputted by the camera and transfers the loaded image data to the storage circuit; and
a processor which controls the interface means so as to transfer image data in different areas out of the image data inputted by the camera,
wherein each of the interface means loads data in an overlapping area out of the externally inputted data and transfers the loaded data to the storage circuit in parallel,
wherein each of the interface means comprises:
an event detecting means which receives a horizontal synchronizing signal, a vertical synchronizing signal, a data output clock signal externally inputted, and detects an event in one frame data output period of the camera according to the horizontal synchronizing signal, the vertical synchronizing signal, and the data output clock signal;
a plurality of counting means each of which counts an event detected by the event detecting means and operable to enable loading of data corresponding to the prescribed area;
a control means which receives data externally inputted, and outputs the data to the storage circuit when one of the counting means outputs an enable signal or stops to output the data when all of the counting means do not output the enable signal; and
an address generating means which generates an address to which the data in the prescribed area outputted by the control means is stored and outputs the enerated address to the storage circuit.

* * * * *